US 6,715,005 B1

(12) United States Patent
Rodriguez et al.

(10) Patent No.: US 6,715,005 B1
(45) Date of Patent: Mar. 30, 2004

(54) METHOD AND SYSTEM FOR REDUCING LATENCY IN MESSAGE PASSING SYSTEMS

(75) Inventors: Jorge R. Rodriguez, Cary, NC (US); Shailabh Nagar, Philadelphia, PA (US)

(73) Assignee: International Business Machines Corporation, Armonk, NJ (US)

( * ) Notice: Subject to any disclaimer, the term of this patent is extended or adjusted under 35 U.S.C. 154(b) by 454 days.

(21) Appl. No.: 09/607,013

(22) Filed: Jun. 29, 2000

(51) Int. Cl.[7] .............................................. G06F 13/14
(52) U.S. Cl. ......................... 710/41; 709/237; 710/48; 710/260; 710/261
(58) Field of Search ............................ 710/41, 48, 260, 710/261; 709/237

(56) References Cited

U.S. PATENT DOCUMENTS

| | | |
|---|---|---|
| 4,159,516 A | 6/1979 | Henrion et al. |
| 5,042,027 A * | 8/1991 | Takase et al. ................. 370/54 |
| 5,081,577 A | 1/1992 | Hatle |
| 5,343,465 A | 8/1994 | Khalil |
| 5,404,536 A | 4/1995 | Ramakrishnan et al. |
| 5,471,618 A | 11/1995 | Isfeld |
| 5,535,380 A | 7/1996 | Bergkvist, Jr., et al. |
| 5,566,351 A | 10/1996 | Crittenden et al. |
| 5,751,593 A * | 5/1998 | Pullela et al. ................ 364/488 |
| 6,105,102 A * | 8/2000 | Williams et al. ............. 710/261 |
| 6,304,911 B1 * | 10/2001 | Brcich et al. ................ 709/237 |
| 6,434,651 B1 * | 8/2002 | Gentry, Jr. et al. .......... 710/260 |

FOREIGN PATENT DOCUMENTS

JP        8186590 A        7/1996

* cited by examiner

*Primary Examiner*—Abdelmoniem Elamin
(74) *Attorney, Agent, or Firm*—Bracewell & Patterson LLP; Martin J. McKinley (57) ABSTRACT

A method and system for synchronizing message transfers from a sender to a receiver, such that message latency and overhead processing are minimized. A next inter-message arrival delay is initially predicted in accordance with traffic history. The predicted inter-message arrival delay is categorized as either an intra-burst delay or an inter-burst delay. In response to a prediction of an inter-burst delay, the receiver is operated in a blocking mode wherein the receiver waits for an interrupt request from the sender. In response to a prediction of an intra-burst delay, the receiver is switched to a polling mode wherein the receiver polls for a message complete signal from said sender.

21 Claims, 5 Drawing Sheets

METHOD AND SYSTEM FOR REDUCING LATENCY IN MESSAGE PASSING SYSTEMS

CROSS-REFERENCE TO RELATED APPLICATION

The present application is related to the following copending U.S. Patent Applications: U.S. patent application Ser. No. 09/607,013, filed on Jun. 29, 2000, the content of which is hereby incorporated herein by reference.

BACKGROUND OF THE INVENTION

1. Technical Field

The present invention relates in general to message passing systems and, in particular, to input/output (I/O) management in asynchronous data transfers. Still more particularly, the present invention relates to utilizing a data unit arrival prediction apparatus to implement an I/O data synchronization policy.

2. Description of the Related Art

As the need for interactivity between computers and processor-based systems increases, improved message handling systems are required for passing messages within host-peripheral and server-client systems. The server-client system performance, in terms of overall latency and overhead processing that are often expended to process a message received by a host or server from a peripheral or client, is an important aspect of message handling that is becoming increasingly troublesome as input/output (I/O) traffic within such systems increases.

Many possible contexts are possible in which message receipt processing arises. A personal computer serving as host to peripheral devices that include a keyboard, a printer, a modem, and a disk drive is one example. Another example is a server-client architecture, in which servers provide internetwork and intranetwork connectivity for many different clients within a telecommunications network. For economy of reference, the "server-client" terminology will be utilized to refer to either type of architecture as well as any other architecture in which the foregoing message receipt problem may be encountered such as node-to-node communication within a cluster network.

In the evolution of server-client systems, two approaches were developed for handling the message passing between server and client devices. The first approach is known as "blocking" mode in which the client signals the server regarding its servicing needs. The other approach is known as polling whereby a server processor successively queries a client devices regarding their needs for servicing. Each of the two approaches has advantages and disadvantages with regard to the aforementioned system performance parameters of latency and overhead CPU utilization.

Polling generally has lower message receipt processing latency than blocking due to the relatively high speed at which client devices may be queried. However, if the time lapse between receipt of a message and acknowledgment thereof is much greater than the latency that would have otherwise been induced by blocking, the message-handling latency advantage over blocking is lost in favor of the processor cycles saved during blocking.

The problem with polling has resulted in efforts to "tune" the manner in which polling is performed to provide an optimum balance between system load and data latency. An example of such an approach is explained in U.S. Pat. No. 5,081,577 in which the interpoll delay constant could be selectively adjusted according to the operating characteristics of the particular peripheral device. In this manner, the polling interval may be optimized so that the peripheral is not overpolled (resulting in polling while the peripheral device is busy) or underpolled (resulting in reduced data throughput).

In theory the tuned polling technique offers great relief and avoids the added latency caused by blocking. In reality however, the tuned polling technique is inflexible at best and impracticable at worst due to its reliance on particular device characteristics. Each peripheral device will have particular delay characteristics depending on upon its function and operating context. If the function and/or operating context change, the tuned polling interval will likely be inappropriate.

Although blocking is a favorable alternative to polling during low traffic periods marked by relatively long inter-message timespans, blocking induces substantial latency into message handling. The asynchronous nature of blocking contributes directly to message latency requiring a kernel transition by the server processor to address receipt of an interrupt.

It can therefore be appreciated that a need exists for an improved message handling technique to accommodate current high-volume traffic in a server-client environment.

SUMMARY OF THE INVENTION

A method and system are disclosed for synchronizing message transfers from a sender to a receiver, such that message latency and overhead processing are minimized. A next inter-message arrival delay is initially predicted in accordance with traffic history. The predicted inter-message arrival delay is categorized as either an intra-burst delay or an inter-burst delay. In response to a prediction of an inter-burst delay, the receiver is operated in a blocking mode wherein the receiver waits for an interrupt request from the sender. In response to a prediction of an intra-burst delay, the receiver is switched to a polling mode wherein the receiver polls for a message complete signal from said sender.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention relates to synchronizing a message-handling process between a sending device (sender) and a receiving device (receiver) within a network interface. As utilized herein, "message-handling" refers to a message transfer operation in which a message in the form of an electronic signal (sometimes referred to as a packet) is transferred from a sender to a receiver, and "synchronization" refers to a receiver determining and processing receipt of a message with maximum efficiency in terms of message transfer latency and overhead processing.

Polling and blocking are conventional techniques utilized for message-handling synchronization under different traffic conditions. Polling lowers message transfer latency and is particularly useful during periods of heavy message traffic. During periods of lighter traffic in which inter-message delays are relatively long, however, the overall efficiency of polling is reduced due to an excess of wasted overhead processor cycles. Blocking adds both latency and overhead CPU utilization to a message handling sequence, but it provides a performance advantage over polling if the inter-message arrival delay is sufficiently large. Deciding between whether to use polling or blocking is important because system performance is affected in terms of message latency and processing overhead. The present invention provides a method to decide whether to poll for a completion signal or to block (wait for an interrupt request).

In addition to the polling and blocking message-handling policies, a hybrid "poll-block" message-handling policy is often utilized to enhance the advantages of and ameliorate the problems associated with the above-mentioned message-handling techniques. One such combination poll-block policy attempts to "minimize its losses" by dynamically switching from one mode to the other depending on current traffic conditions. Such a poll-block policy entails a receiver polling a message complete flag for a period equal to the interrupt latency associated with blocking. If a message complete signal has not been delivered from the sender prior to expiration of the polling period, the receiver's message-handling mode is switched from polling to blocking such that the receiver waits for an interrupt request from the sender. Whereas polling is preferable during periods of heavy message traffic and blocking is more efficient for lower traffic marked by longer inter-message timespans, a combination poll-blocking policy provides superior performance for bursty traffic.

Although preferable to polling or blocking during bursty traffic, conventional poll-blocking as described above loses efficiency during each transition to or from a burst. The present invention addresses this problem by providing a method for implementing a combination pollblock policy that is guided by predictions of anticipated traffic levels.

With accurate knowledge of future message arrival activity, an "optimal policy" can be utilized to provide optimum performance in terms of minimizing processing overhead and latency. Such an optimal policy is defined herein as an ideal runtime selection mechanism for switching between polling and blocking as the message handling mechanism for a receiver. Such a selection mechanism is premised on a 100% accurate prediction of when the traffic level will switch to or from a burst. The greatest performance cost incurred by such an optimal policy is that of a single interrupt overhead delay interval. A poll-block policy as described above incurs a cost in terms of message latency and processing overhead that is between one and two times that of the optimal policy.

The asynchronous nature of network traffic prevents the optimal from being realizable. The present invention provides for implementation of a synchronization technique that optimizes a poll-block policy by utilizing inter-message arrival delay predictions to select between polling and blocking, such that synchronization performance can be maintained between that of conventional poll-blocking and the optimal policy.

In accordance with the present invention, the predicted inter-message arrival delay for a next message is based on a prediction algorithm that models message traffic history. In a preferred embodiment of the present invention, a modified Markov Modulated Poisson Process (MMPP) serves as a model for translating traffic history into an estimation of a present traffic level that is then utilized for determining an appropriate message handling mode.

The model characterizes the traffic and the parameters of the model are stored in a table that is accessed when making the poll-versus-block decision. The efficiency of the resulting synchronization policy in terms of message transfer latency and processing overhead is between that of the optimal policy and the poll-block policy.

Figure 1:
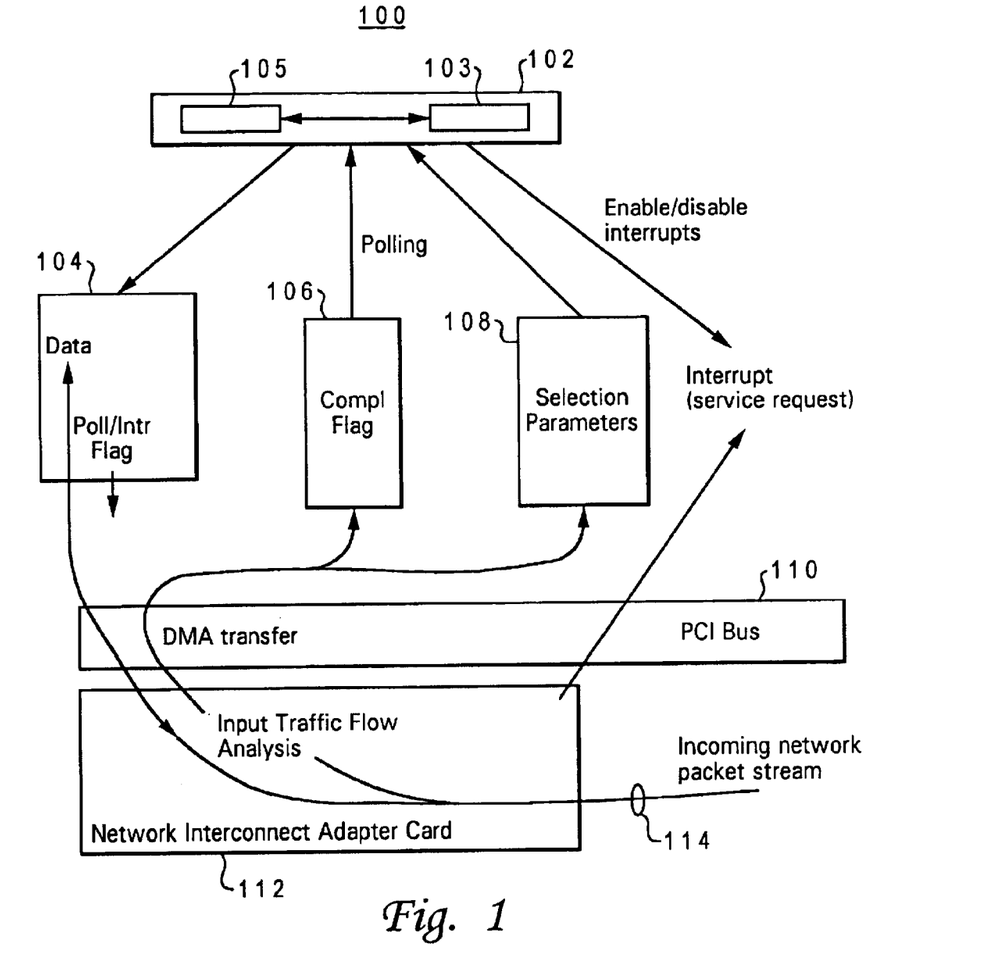
FIG. 1 illustrates a telecommunications network interface having a message synchronization mechanism according to a preferred embodiment of the present invention.

With reference now to the figures wherein like reference numerals refer to like and corresponding parts throughout, and in particular with reference to FIG. 1, there is depicted an illustrative embodiment of a network interface 100 in which a method and system of the present invention may be advantageously implemented. As shown in FIG. 1, a network interface 100 includes a host application 102 that receives messages in the form of data packets from an incoming packet stream 114 via a network interconnect adapter card 112. In the context of the synchronization method described hereinbelow, host application 102 is the "receiver" that receives messages from one or more senders. The senders that deliver messages into incoming network packet stream 114 are not depicted in FIG. 1.

Host application 102 is operable in either a polling mode or a blocking mode depending on a predicted inter-message arrival delay parameter. A combination poll-block mode is also possible in which host application 102 polls during periods of low inter-message delay and automatically switches to blocking when the inter-massage arrival delay exceeds a pre-determined threshold. Assuming bursty traffic on incoming network packet stream 114, the inter-message arrival delay of each packet is categorizable into one of at least three categories including a burst delay, a non-burst delay, and a transition delay to or from a burst.

The efficiency of packet receipt processing by application 102 can be measured in terms of message transfer latency and CPU processing overhead. Conventional message-handling techniques such as polling and blocking are designed to minimize message transfer latency and overhead processing under differing traffic conditions. Polling is less obtrusive for a given incoming packet synchronization evolution than blocking and therefore preferable during periods of heavy traffic. Due to its continual usage of CPU processing cycles, however, polling is less efficient than blocking during periods of low traffic in which the inter-packet arrival delay is sufficiently great.

In the depicted example, host application 102 includes a message-handling synchronization mechanism 103 that dynamically selects between operating in a polling or blocking mode. Synchronization mechanism 103 may be implemented utilizing any combination of computer programming software, firmware, or hardware that is programmed to select a message-handling mode according to a set of selection parameters 108 that are relevant in making the poll versus block decision. The computer programming code (whether software or firmware) comprising synchronization mechanism 103 is stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is utilized by either executing the code directly from the storage device, by copying the code from the storage device into another storage device such as a RAM, etc. or by transmitting the code on a network for remote execution.

Selection parameters 108 utilized by synchronization mechanism 103 are listed as follows:

$t_d$=inter-message arrival delay time (since the start of a synchronization period);

$t_{LAT}$=receive latency time (can exceed $t_d$);

$T_{LAT-BOUND}$=upper bound for the receive latency time;

$t_{OH}$=latency time induced in the receiving processor resulting from processing overhead required for polling and/or interrupt processing;

$t_{OH-BOUND}$=upper bound for the processor overhead;

$t_p$=polling time; and $t_{BLK}$=interrupt overhead time.

As explained in further detail with reference to FIGS. 2 and 3, selection parameters 108 are utilized as the state-transition guidelines for a modified Markov Modulated Poisson Process (MMPP) that is modified to perform the necessary traffic predictions within network interface 100.

To implement the synchronization technique of the present invention it is necessary to determine a history of traffic patterns from senders to host application 102 via incoming network packet stream 114. Such a traffic history is utilized by programmed synchronization mechanism 103 to derive selection parameters 108 that are then input into a modified Markov Modulated Poisson Process (MMPP), such at that depicted in FIGS. 2 and 3 to make inter-message arrival predictions that form the basis for dynamically selecting between various message-handling modes. Collection of traffic pattern history may be performed off-line, with the results pre-stored within host application 102 and accessible to synchronization mechanism 103, or on-line, with the results obtained and modified during runtime network operation.

Network interface 100 further includes a host processor 105 for performing server processing functions within host application 102, and a network interconnect controller (NIC) 112 for analyzing and determining routing requirements for packets from network packet stream 114. Either host processor 105 or NIC 112 may be utilized to take the aforementioned time stamps. In a preferred embodiment, the time stamps are taken utilizing processing means within NIC 112.

There are several reasons for this preference, the most important of which is that the burstiness of the network traffic through network packet stream 114 is changed by intervening queues such as input buffer 104. The interarrival timing is thus altered as packets flow through NIC 112. Another reason is that it is preferable to offload the time stamping task from host processor 105 to free it for other server-related uses within host application 102.

When the arrival time stamps are taken, these values are recorded in a memory location where they are made available to host processor 105 which utilizes synchronization mechanism 103 to make the polling/blocking decision. The inter-packet delay, $\Delta t$, is made available to host processor 105 via a direct memory access (DMA) write transfer across a peripheral component interface (PCI) bus 110 to a pre-specified location. Alternatively, host processor 105 may read a memory location in NIC 112 where the value is stored. Host processor 105 then completes the testing necessary to make the polling/blocking decision.

In the data packet context of FIG. 1, traffic patterns are identified and designated by taking time-stamps of two or more sequential packets within incoming network packet stream 114. The time-stamp of two consecutive packets is recorded within a memory device within host application 102. The time difference, $\Delta t$, between arrival time, $t_i$, of presently arriving packet i, and arrival time, $t_{i-1}$, of the previous packet (i-1) is determined and recorded. Inter-message arrival delay $\Delta t$ over interval i, is assumed to be representative of the traffic pattern from a particular sender to host application 102 with some level of error. Methods for minimizing such error will be described with reference to the following figures.

When time-stamps of the arriving packets are taken at either NIC 112 or host processor 105, these values are recorded in a memory location within host application 102 where they are translated into selection parameters 108 that are accessible by synchronization mechanism 103 which makes the polling/blocking decision.

Figure 2:
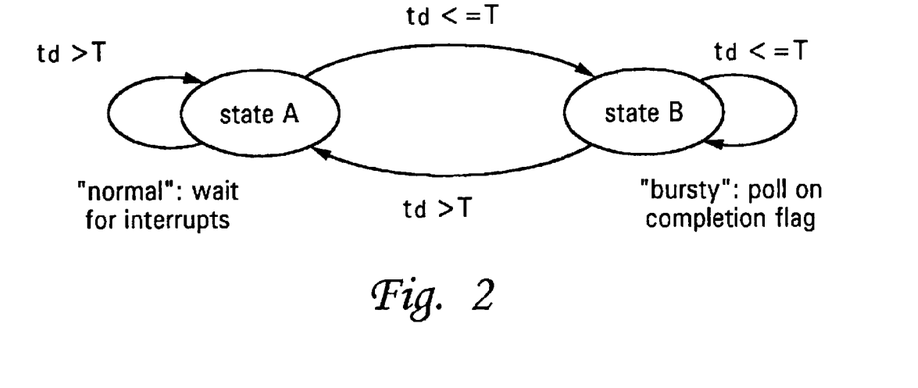
FIG. 2 depicts a bimodal sequencer for predicting an inter-message arrival delay in accordance with a preferred embodiment of the present invention.
Figure 3:
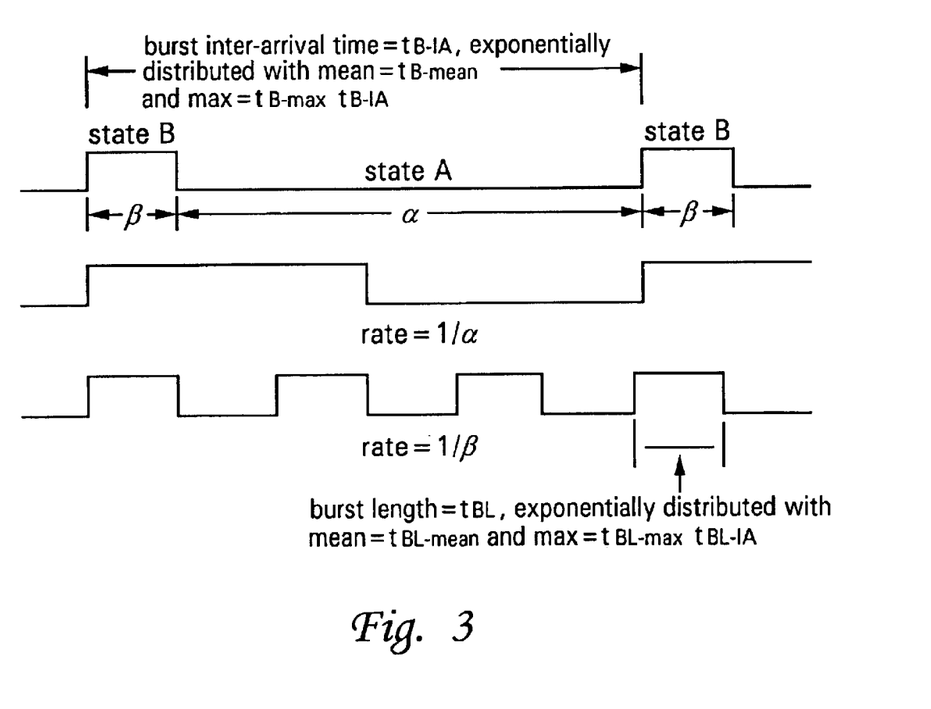
FIG. 3 is a timing diagram illustrating a time line state transition sequence of the bimodal sequencer of FIG. 2.

Turning now to FIG. 2, there is illustrated a modified MMPP sequencer 200 that utilizes selection parameters 108 for runtime message handling mode selection. As shown in FIG. 2, modified MMPP sequencer 200 is a bimodal sequencer in which a non-burst state A transitions to and from a burst state B. The definition of "burst" with respect to modified MMPP sequencer 200 is a message traffic level delivered from a particular sender to host application 102 having sufficient intensity, such that the maximum inter-packet arrival delay, $t_{max}$, is less than or equal to the overhead latency induced by an interrupt request. Depending on the choice of $t_{max}$ different cases for burstiness can be described by modified MMPP sequencer 200. FIG. 3 illustrates the relationship between $t_{max}$ and different traffic loads and design goals of the system.

Figure 4:
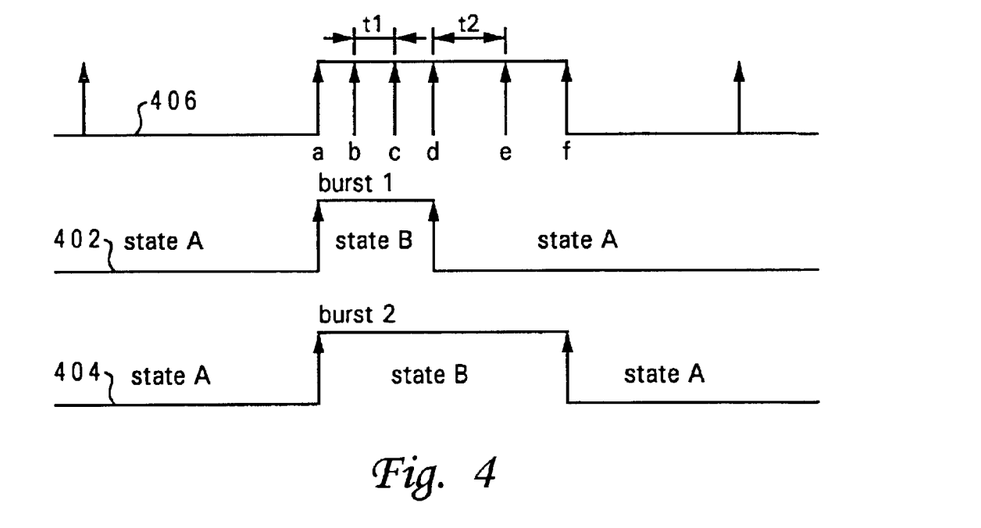
FIG. 4 is a timing diagram depicting different burst profiles for a given traffic sequence that may be predicted in accordance with a preferred embodiment of the present invention.
Figure 5:
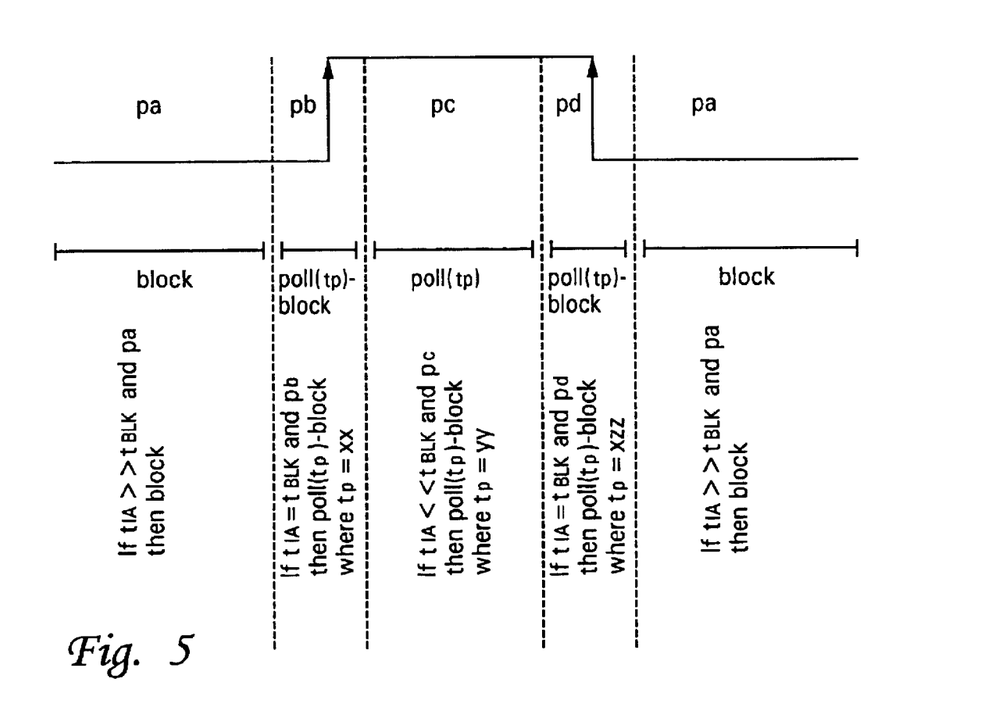
FIG. 5 is a timing diagram illustrating a correlation between predicted inter-message arrival delay probabilities and realtime message synchronization modes selection.

As illustrated in FIG. 4, a first burst profile 402 is defined by setting $t_{max}$ equal to a maximum inter-arrival time of $t_1$ between four network messages a, b, c, and d. If $t_{max}$ is set equal to the maximum inter-message arrival delay, $t_2$, between received messages e and f, a longer burst profile 404 is then defined.

Referring back to FIG. 2, network interface 100 remains in non-burst state A for a mean time duration of a and in burst state B for a mean duration of β. When network interface 100 is in state A, the inter-message arrival rate, $q_a$, is characterized by the average rate over a relatively long period of time (greater than $t_{max}$). When network interface 100 is in state B, the packet inter-arrival rate, $q_b$, is characterized as being faster than the average rate, $q_{mean}$, over a shorter period of time.

Two state transition rates $q_{ab}$ and $q_{ba}$ specify the transitions between states A and B. The values of each state transitions rate are given by: $q_{ab}=1/\alpha$, and $q_{ba}=1/\beta$. The timing relationships specified by modified MMPP sequencer 200 and selection parameters 108 are illustrated in FIG. 3. As can be seen in FIG. 3, when network interface 100 is in state A, it will remain at state A for a mean time $\alpha$ and will transition to state B with a transition rate $1/\alpha$. On the other hand, when network interface is in state B, it will stay at state B for a mean time $\beta$ and will transition to state A with a transition rate of $1/\beta$.

Returning to FIG. 2, it should be noted that modified MMPP sequencer 200 represents message traffic at two levels. A "top-level" process is represented by the parameters of the two state transition rates $q_{ab}$ and $q_{ba}$ as explained above. A "bottom-level" process is represented by parameters $q_a$ and $q_b$, that as described above, represent the inter-arrival rate of messages into input buffer 104.

In an important feature of the present invention, modified MMPP 200 is specified by a fundamental parameter, $\Delta t$, that is the inter-message arrival delay over an interval i such that $\Delta t = t_i - t_{i-1}$. This actual inter-message arrival delay $\Delta t$ is determined by taking time stamps of consecutive arrivals. When the time stamps of the arrivals are taken, these values recorded in a memory location where they are made available to the host process making the polling/block decision. The value $t_d = \Delta t$ can be made available to the host routine either via a direct memory access (DMA) write transfer to a pre-specified memory location, or the host routine can read a location in the NIC where the value is stored. The host routine then completes the testing needed to make the polling/blocking decision.

The variable, $t_d$, in FIG. 2 is set equal to a time difference between the arrival time of two consecutive packets within incoming packet stream 114 delivered from a particular sender. The pre-determined value of $\Delta t$ is utilized in conjunction with $t_d$ by sequencer 200 to determine a runtime determination of which if any of the four possible transitions should be made.

For example, if sequencer 200 is in state A and $t_d > \Delta t$, the presently arriving packet is identified as occurring within state A wherein sequencer 200 will remain. On the other hand, if $t_d \leq \Delta t$ while sequencer 200 is in state A, the presently arriving packet is determined by sequencer 200 to define the edge of a new burst and sequencer 200 transitions to state B. Likewise, if sequencer is in state B and $t_d \leq \Delta t$, the present packet is defined by sequencer as occurring within a burst and sequencer 200 remains in state B. If, however, $t_d > \Delta t$ while sequencer 200 is in state B, then the presently arriving packet is defines a trailing edge of a new inter-burst (or non-burst) period resulting in sequencer 200 transitioning from state B to state A.

Figure 6:
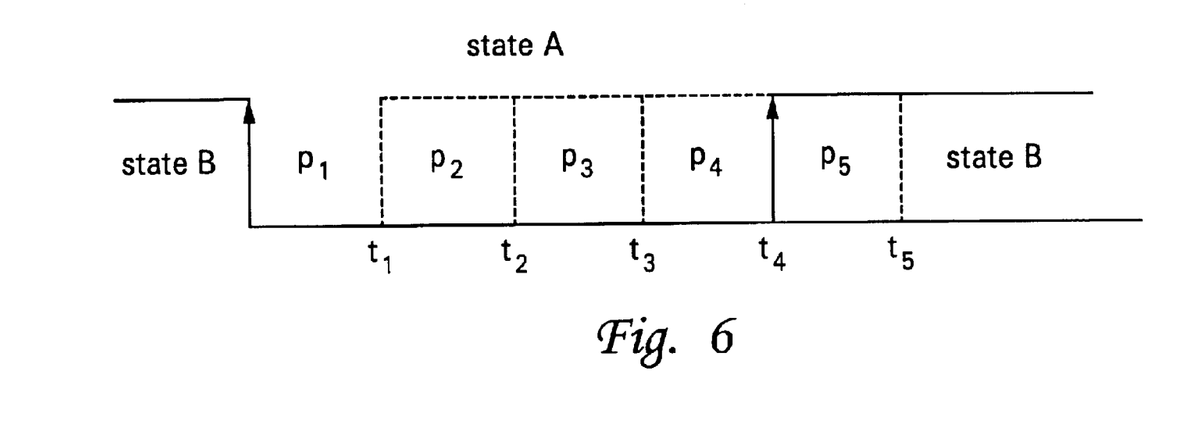
FIG. 6 is a graphical representation of probabilities utilized to predict arrivals during an inter-burst period in accordance with a preferred embodiment of the present invention.
Figure 7:
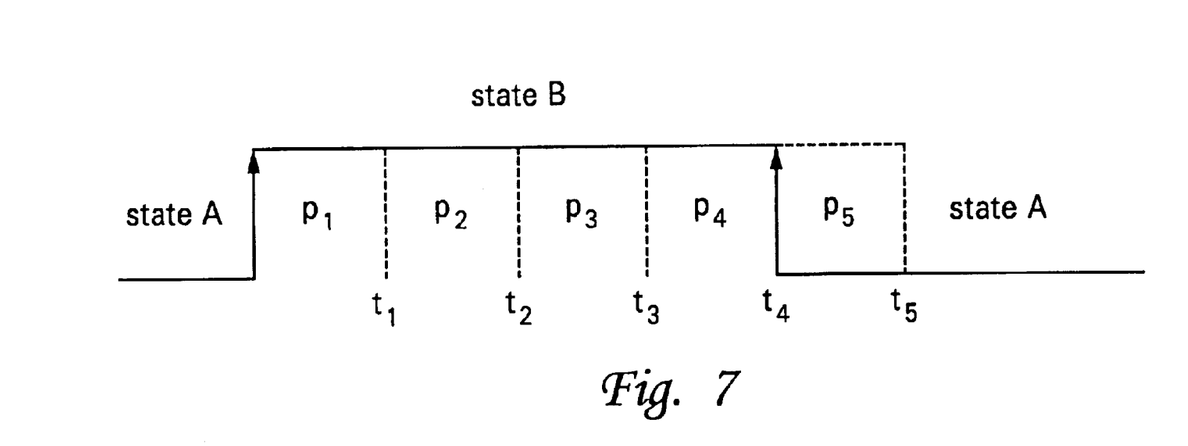
FIG. 7 is a graphical representation of probabilities utilized to predict arrivals before and after a burst period in accordance with a preferred embodiment of the present invention.

With reference now to FIGS. 6 and 7 there are illustrated graphical representations of probabilities utilized to predict arrivals during a burst and during an inter-burst period in accordance with a preferred embodiment of the present invention. FIG. 6 depicts a diagrammatic representation of probabilities $p_1$, $p_2$, $P_3$, $P_4$, and $p_5$ corresponding to time intervals $t_1$, $t_2$, $t_3$, $t_4$, and $t_5$ in accordance with a bimodal sequencer having a state A representing a non-burst, and a state B representing a burst. The transition at $t_4$ represents a transition from state A (non-burst) to state B (burst). FIG. 7 is a diagrammatic representation of probabilities generated by a bimodal sequencer to predict arrivals before and after a burst period in accordance with a preferred embodiment of the present invention.

Figure 8:
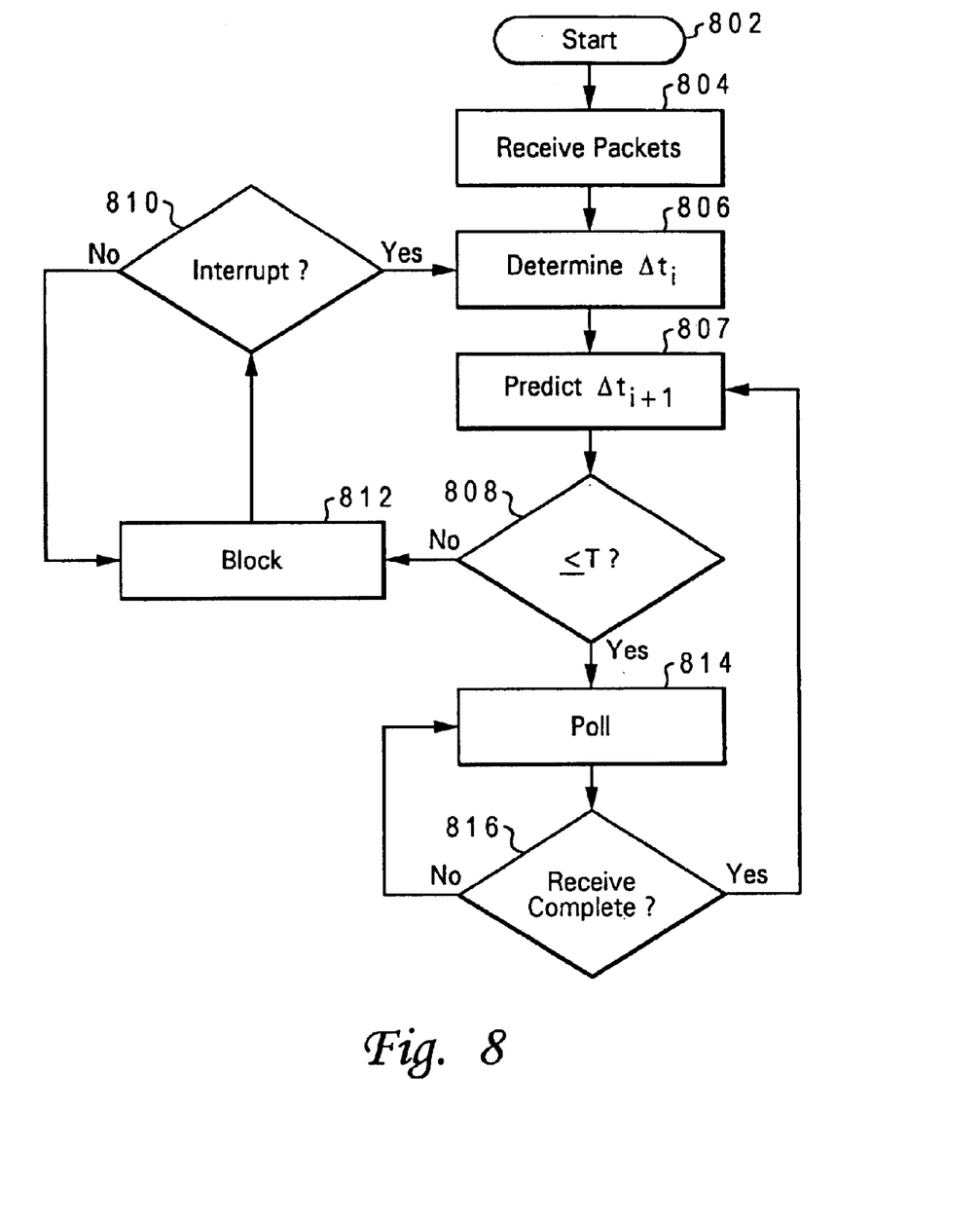
FIG. 8 is a logic flow diagram depicting steps performed during message synchronization in accordance with a preferred embodiment of the present invention.

Referring to FIG. 8, there is illustrated a logic flow diagram depicting steps performed during message-handling synchronization within network interface 100 in accordance with a preferred embodiment of the present invention. Specifically, a method for synchronizing message transfers from a sender to a receiver is shown starting at step 802 and proceeding to step 804 which illustrates receipt of a packet by a receiving unit such as a server.

Next, as illustrated at step 806, the receiver responds to receipt of packet i by determining the $\Delta t$ for the period between packet i and the previous arrival (packet (i−1)). It should be noted that the depiction of a single packet arrival at step 806 is a simplification of a possibly broader inquiry into the present level of traffic that the receiver is experiencing. Recalling FIGS. 2 and 3, a bimodal sequencer may be utilized to provide a near real-time traffic level determination.

From the traffic level determination at step 806, the receiver predicts the inter-message arrival delay for the next incoming packet as depicted at step 807. As explained previously, the prediction illustrated at step 807 is premised on the assumption bursty traffic conditions. A modified Markov Modulated Poisson Process (MMPP) is utilized as the base formula for performing the prediction shown at step 807.

Next, as depicted at step 808, a determination is made whether the predicted inter-packet delay is less than or equal to an interrupt delay period, T. If so, and as illustrated at step 814 the receiver operates in a polling mode until a receive complete signal is received at which time the receiver performs another inter-packet delay prediction as shown at step 807. As depicted at step 812, when a predicted inter-packet delay is greater than the interrupt delay, T, the receiver enters a blocking mode wherein it remains until an interrupt request is received by the receiver as depicted at step 810.

Utilizing an interrupt delay period, T, as the comparison parameter at step 808 in combination with the prediction made at step 807 results in an improved poll-block technique whereby CPU utilization depends upon traffic conditions and T. In an alternate embodiment, the interrupt delay parameter T may be replaced by an absolute CPU utilization bound, $T_{OH\text{-}BOUND}$. In this manner it is possible to provide reduced latency while simultaneously maintaining an absolute limit on CPU utilization.

The message handling selection techniques disclosed herein are founded on the presumption of bursty network traffic. In bursty traffic there are two distinct regions to consider—intra-burst traffic and inter-burst traffic. The delay induced by an interrupt request, $t_{BLK}$, is the parameter utilized to differentiate between intra- and inter-burst periods. Specifically, if the inter-message delay, $t_d$, is determined to be less than or equal to $t_{BLK}$, the traffic pattern is considered intra-burst. On the other hand, if $t_d$ is greater than $t_{BLK}$, the traffic pattern is characterized as inter-burst.

The burstiness categorization is determined according to a prediction of the delay of upcoming traffic. In a preferred embodiment of the invention, the prediction of inter-message arrival delays is based on exponential smoothing techniques. A Markov Modulated Poisson Process may be utilized as a base formula which can be modified to perform inter-message arrival delay predication in accordance with the teachings of the present invention. The following exponential smoothing formula may thus be utilized:

$$P_i = \alpha(A_{i-1}) + (1-\alpha)(P_{i-1}),$$

wherein $P_i$ represents the predicted arrival delay between packet (i−1) and packet i, $A_{(i-1)}$ represents the determined delay for packet (i−1), $P_{(i-1)}$ represents a predicted arrival delay between said packet (i–1) and a previous packet (i–2). The parameter a represents an empirically determined number between 0 and 1 that best matches the particular traffic pattern that the receiver is currently experiencing.

The efficiency and accuracy of the above referenced prediction formula can be greatly improved by truncating the input series parameter A such that sufficiently extended delays are removed from consideration. The input series is limited to arrival delays, N, wherein $0<N<t_{BLK}$ and delays of length M, wherein $t_{BLK}>M$. In this manner the resulting prediction Pi for arrival i becomes bimodal. This truncation of the time series simplifies the prediction computation and results in greater prediction accuracy.

In an alternate embodiment, the above-described exponential smoothing technique can be further modified so that the selection between polling and blocking can be simultaneously optimized with respect to both processing overhead and message latency. This technique accounts for the fact that although the exponential smoothing technique described above provides the lowest processing overhead, the poll policy remains the optimum approach with respect to message latency.

An alternate embodiment of the invention capitalizes on the predictive nature of the techniques described herein, such that a polling policy can be combined with a combination poll/block policy to obtain an optimal message handling solution wherein latency is minimized in view of an absolute processing overhead boundary, $t_{OH-BOUND}$. This overhead boundary is implemented as the key guidepost in the following three-step algorithm:

1) Compute $P_i$,
2) If $P_i > t_{OH-BOUND}$, then operate receiver in poll/blocking in accordance with exponential smoothing;
3) If $P_i < t_{OH-BOUND}$, then operate receiver in polling mode.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of one or more computer systems. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described within reference to the figures can be accomplished with a computer-aided device. In such a method, data stored in a memory unit of a data-processing system such as a data-processing system, can represent steps in a method for implementing a preferred embodiment of the present invention.

While the invention has been particularly shown and described with reference to a preferred embodiment, it will be understood by those skilled in the art that various changes in form and detail may be made therein without departing from the spirit and scope of the invention.

What is claimed is:

1. A method for synchronizing message transfers from a sender to a receiver, said method comprising:
   determining a present level of message traffic from a sender to a receiver by modeling said present traffic level utilizing a bimodal sequencer that sequences between burst periods and non-burst periods, such that said present level of message traffic is determinable as one of at least three traffic levels including a burst, a non-burst, and a transition to or from a burst;
   predicting an inter-message arrival delay based on said determined present level of message traffic;
   in response to predicting that said inter-message arrival delay is an inter-burst delay, operating said receiver in a blocking mode such that said receiver waits for an interrupt request from said sender; and
   in response to predicting that said inter-message arrival delay is an intra-burst delay, operating said receiver in a polling mode such that said receiver polls for a message complete signal from said sender.

2. The method of claim 1, wherein said modeling said present traffic level utilizing a bimodal sequencer further comprises modeling said present level of message traffic according to a modified Markov Modulated Poisson Process.

3. The method of claim 1, wherein said receiver is operable in one of at least three message handling modes including said polling mode, said blocking mode, and a poll-block mode wherein for a period equal to an interrupt delay period, said receiver is operated in said polling mode, and wherein in response to detecting said message complete signal prior to elapse of said interrupt delay period, said receiver is maintained in said polling mode, and in response to not detecting said message complete signal prior to elapse of said interrupt delay period, said receiver is switched from said polling mode to said blocking mode, said method further comprising:
   in response to determining a present non-burst, operating said receiver in said blocking mode;
   in response to determining a present burst, operating said receiver in said polling mode; and
   in response to determining a present transition to or from a burst, operating said receiver in said pollblock mode.

4. The method of claim 3, wherein said predicting step is followed by:
   comparing said predicted inter-message arrival delay to said interrupt delay period;
   in response to said predicted inter-message arrival delay being greater than said interrupt delay period, operating said receiver in a blocking mode; and
   in response to said predicted inter-message arrival delay being less than said interrupt delay period, operating said receiver in a polling mode.

5. The method of claim 3, wherein said predicting is followed by:
   comparing said predicted inter-message arrival delay to a CPU utilization boundary;
   in response to said predicted inter-message arrival delay being greater than said CPU utilization boundary, operating said receiver in a blocking mode; and
   in response to said predicted inter-message arrival delay being less than said CPU utilization boundary, operating said receiver in a polling mode.

6. The method of claim 1, wherein said determining a present level of message traffic is preceded by:
   identifying a plurality of distinct traffic patterns from said sender to said receiver; and
   correlating each of said plurality of traffic patterns to said burst, said non-burst, and said transition to or from said burst, such that a determined present level of message traffic is categorizable as either a burst, a non-burst, or a transition to or from a burst.

7. The method of claim 6, wherein said identifying further comprises:
   collecting time stamps of consecutive messages delivered from said sender to said receiver;
   determining a time differential between said collected time stamps; and associating said time differential with one of said plurality of traffic patterns, such that said time differential may be utilized during said predicting an inter-message arrival-delay.

8. An apparatus for synchronizing message transfers from a sender to a receiver, said apparatus comprising:
   processing means for determining a present level of message traffic from a sender to a receiver, wherein said processing means further comprises processing means for modeling said present traffic level utilizing a bimodal sequencer that sequences between burst periods and non-burst periods, such that said present level of message traffic is determinable as one of at least three traffic levels including a burst, a non-burst, and a transition to or from a burst;
   processing means for predicting an inter-message arrival delay based on said determined present level of message traffic;
   processing means responsive to predicting that said inter-message arrival delay is an inter-burst delay, for operating said receiver in a blocking mode such that said receiver waits for an interrupt request from said sender; and
   processing means responsive to predicting that said inter-message arrival delay is an intra-burst delay, for operating said receiver in a polling mode such that said receiver polls for a message complete signal from said sender.

9. The apparatus of claim 8, wherein said processing means for modeling said present traffic level utilizing a bimodal sequencer further comprises processing means for modeling said present level of message traffic according to a modified Markov Modulated Poisson Process.

10. The apparatus of claim 8, wherein said receiver is operable in one of at least three message handling modes including said polling mode, said blocking mode, and a poll-block mode wherein for a period equal to an interrupt delay period, said receiver is operated in said polling mode, and wherein in response to detecting said message complete signal prior to elapse of said interrupt delay period, said receiver is maintained in said polling mode, and in response to not detecting said message complete signal prior to elapse of said interrupt delay period, said receiver is switched from said polling mode to said blocking mode, said apparatus further comprising:
   processing means responsive to determining a present non-burst, for operating said receiver in said blocking mode;
   processing means responsive to determining a present burst, for operating said receiver in said polling mode; and
   processing means responsive to determining a present transition to or from a burst, for operating said receiver in said poll-block mode.

11. The apparatus of claim 10, wherein said processing means for predicting an inter-message arrival delay further comprises:
   processing means for comparing said predicted intermessage arrival delay to said interrupt delay period;
   processing means responsive to said predicted intermessage arrival delay being greater than said interrupt delay period, for operating said receiver in a blocking mode; and
   processing means responsive to said predicted intermessage arrival delay being less than said interrupt delay period, for operating said receiver in a polling mode.

12. The apparatus of claim 10, wherein said processing means for predicting an inter-message arrival delay further comprises:
   processing means for comparing said predicted intermessage arrival delay to a CPU utilization boundary;
   processing means responsive to said predicted intermessage arrival delay being greater than said CPU utilization boundary, for operating said receiver in a blocking mode; and
   processing means responsive to said predicted intermessage arrival delay being less than said CPU utilization boundary, for operating said receiver in a polling mode.

13. The apparatus of claim 8, wherein said processing means for determining a present level of message traffic from said sender to said receiver further comprises:
   processing means for identifying a plurality of distinct traffic patterns from said sender to said receiver; and
   processing means for correlating each of said plurality of traffic patterns to said burst, said nonburst, and said transition to or from said burst, such that a determined present level of message traffic is categorizable as either a burst, a non-burst, or a transition to or from a burst.

14. The apparatus of claim 13, wherein said processing means for identifying a plurality of distinct traffic patterns from said sender to said receiver further comprises:
   processing means for collecting time stamps of consecutive messages delivered from said sender to said receiver;
   processing means for determining a time differential between said collected time stamps; and
   processing means for associating said time differential with one of said plurality of traffic patterns, such that said time differential may be utilized during said predicting an inter-message arrival delay.

15. A program product within a computer readable storage media for synchronizing message-transfers from a sender to a receiver, said program product comprising:
   instruction means for determining a present level of message traffic from a sender to a receiver, wherein said instruction means further comprises instruction means for modeling said present traffic level utilizing a bimodal sequencer that sequences between burst periods and non-burst periods, such that said present level of message traffic is determinable as one of at least three traffic levels including a burst, a non-burst, and a transition to or from a burst;
   instruction means for predicting an inter-message arrival delay based on said determined present level of message traffic;

instruction means responsive to predicting that said inter-message arrival delay is an inter-burst delay, for operating said receiver in a blocking mode such that said receiver waits for an interrupt request from said sender; and instruction means responsive to predicting that said inter-message arrival delay is an intra-burst delay, for operating said receiver in a polling mode such that said receiver polls for a message complete signal from said sender.

16. The program product of claim 15, wherein said instruction means for modeling said present traffic level utilizing a bimodal sequencer further comprises instruction means for modeling said present level of message traffic according to a modified Markov Modulated Poisson Process.

17. The program product of claim 15, wherein said receiver is operable in one of at least three message handling modes including said polling mode, said blocking mode, and a poll-block mode wherein for a period equal to an interrupt delay period, said receiver is operated in said polling mode, and wherein in response to detecting said message complete signal prior to elapse of said interrupt delay period, said receiver is maintained in said polling mode, and in response to not detecting said message complete signal prior to elapse of said interrupt delay period, said receiver is switched from said polling mode to said blocking mode, said program product further comprising:

instruction means responsive to determining a present non-burst, for operating said receiver in said blocking mode;

instruction means responsive to determining a present burst, for operating said receiver in said polling mode; and instruction means responsive to determining a present transition to or from a burst, for operating said receiver in said poll-block mode.

18. The program product of claim 17, wherein said instruction means for predicting an inter-message arrival delay further comprises:

instruction means for comparing said predicted inter-message arrival delay to said interrupt delay period;

instruction means responsive to said predicted inter-message arrival delay being greater than said interrupt delay period, for operating said receiver in a blocking mode; and instruction means responsive to said predicted inter-message arrival delay being less than said interrupt delay period, for operating said receiver in a polling mode.

19. The program product of claim 17, wherein said instruction means for predicting an inter-message arrival delay further comprises:

instruction means for comparing said predicted inter-message arrival delay to a CPU utilization boundary;

instruction means responsive to said predicted inter-message arrival delay being greater than said CPU utilization boundary, for operating said receiver in a blocking mode; and instruction means responsive to said predicted inter-message arrival delay being less than said CPU utilization boundary, for operating said receiver in a polling mode.

20. The program product of claim 15, wherein said instruction means for determining a present level of message traffic from said sender to said receiver further comprises:

instruction means for identifying a plurality of distinct traffic patterns from said sender to said receiver; and instruction means for correlating each of said plurality of traffic patterns to said burst, said nonburst, and said transition to or from said burst, such that a determined present level of message traffic is categorizable as either a burst, a non-burst, or a transition to or from a burst.

21. The program product of claim 20, wherein said instruction means for identifying a plurality of distinct traffic patterns from said sender to said receiver further comprises:

instruction means for collecting time stamps of consecutive messages delivered from said sender to said receiver;

instruction means for determining a time differential between said collected time stamps; and instruction means for associating said time differential with one of said plurality of traffic patterns, such that said time differential may be utilized during said predicting an inter-message arrival delay.

* * * * *